(12) United States Patent
Savitski (10) Patent No.: US 10,926,355 B2
(45) Date of Patent: Feb. 23, 2021

(54) SYSTEMS AND METHODS FOR LASER-WELDING TUBULAR COMPONENTS USING A SINGLE, FIXED OPTICAL REFLECTOR WITH MULTIPLE REFLECTING SURFACES

(71) Applicant: Dukane IAS, LLC, St. Charles, IL (US)

(72) Inventor: Alexander Savitski, Arlington Heights, IL (US)

(73) Assignee: Dukane IAS, LLC, St. Charles, IL (US)

( * ) Notice: Subject to any disclaimer, the term of this patent is extended or adjusted under 35 U.S.C. 154(b) by 0 days.

(21) Appl. No.: 16/352,104

(22) Filed: Mar. 13, 2019

(65) Prior Publication Data

US 2020/0246916 A1    Aug. 6, 2020

Related U.S. Application Data

(60) Provisional application No. 62/801,269, filed on Feb. 5, 2019.

(51) Int. Cl.
*B23K 26/28* (2014.01)
*B23K 26/08* (2014.01)
(Continued)

(52) U.S. Cl.
CPC ........ *B23K 26/282* (2015.10); *B23K 26/0643* (2013.01); *B23K 26/083* (2013.01);
(Continued)

(58) Field of Classification Search
CPC .............. B23K 26/282; B23K 26/0643; B23K 26/0869; B23K 26/083
See application file for complete search history.

(56) References Cited

U.S. PATENT DOCUMENTS 3,835,912 A    9/1974 Kristensen
3,943,324 A    3/1976 Haggerty
(Continued)

FOREIGN PATENT DOCUMENTS

DE         4122093 A1    1/1993
DE    202007001346 U1    4/2007
(Continued)

OTHER PUBLICATIONS

Machine translation of Japan Patent document No. JP04-143,092-A, May 2019.*

(Continued)

*Primary Examiner* — Geoffrey S Evans
(74) *Attorney, Agent, or Firm* — Nixon Peabody LLP (57) ABSTRACT

Device and method for laser welding around a circumference of a workpiece. A fixed, non-movable unitary optical reflector is provided, which has a pair of optical reflecting surface portions on a first side surface and a second side surface, respectively, arranged at an obtuse angle relative to each other. A workpiece is positioned and fixed in an assembly that includes the unitary optical reflector. During setup, the vertical distance is adjusted between the unitary optical reflector and the workpiece along an axis that is transverse to a longitudinal axis of the workpiece without any adjustment of the reflecting surfaces, which remain fixed during setup. The first and second side surfaces define a curve that is transverse to the longitudinal axis. Once setup has been completed, a laser beam is directed so that it moves along the optical reflector to thereby produce a 360 degree circumferential weld around the workpiece.

12 Claims, 5 Drawing Sheets

(51) Int. Cl.
    *B23K 26/06*   (2014.01)
    *B23K 26/282*  (2014.01)
    *B23K 101/00*  (2006.01)
    *B23K 101/06*  (2006.01)
(52) U.S. Cl.
    CPC .... *B23K 26/0869* (2013.01); *B23K 2101/006*
              (2018.08); *B23K 2101/06* (2018.08)

(56) References Cited

U.S. PATENT DOCUMENTS

| | | | |
|---|---|---|---|
| 3,989,778 A | 11/1976 | Osborne | |
| 4,266,667 A | 5/1981 | Ishigaki | |
| 4,350,867 A | 9/1982 | Kinoshita | |
| 4,429,211 A | 1/1984 | Carstens | |
| 4,572,941 A | 2/1986 | Sciaky | |
| 4,794,231 A | 12/1988 | Banas | |
| 5,011,282 A * | 4/1991 | Ream | B23K 26/043 356/153 |
| 5,049,720 A | 9/1991 | Fang | |
| 5,052,414 A | 10/1991 | Aindow | |
| 5,126,872 A | 6/1992 | Birkle | |
| 5,449,879 A | 9/1995 | Lawson | |
| 5,478,983 A | 12/1995 | Rancourt | |
| 5,508,490 A | 4/1996 | Klose | |
| 5,601,676 A | 2/1997 | Zimmerman | |
| 6,465,757 B1 | 10/2002 | Chen | |
| 6,476,345 B1 | 11/2002 | Sator | |
| 6,705,727 B1 | 3/2004 | Bentley | |
| 7,282,665 B2 | 10/2007 | Chen | |
| 7,368,381 B2 | 5/2008 | Mikhailov | |
| 7,564,006 B2 | 7/2009 | Schwob | |
| 8,404,994 B2 | 3/2013 | Spennemann | |
| 8,505,604 B2 | 8/2013 | Stauffer | |
| 9,393,738 B2 | 7/2016 | Kugelmann | |
| 2001/0028567 A1 | 10/2001 | Akiyama | |
| 2003/0102289 A1 | 6/2003 | Nissels | |
| 2003/0196750 A1 | 10/2003 | Sakai | |
| 2005/0103763 A1 | 5/2005 | Momose | |
| 2005/0121137 A1 | 6/2005 | Kirkland | |
| 2005/0167407 A1 | 8/2005 | Chen | |
| 2006/0134994 A1 | 6/2006 | Yasuda | |
| 2007/0045250 A1 | 3/2007 | Moor | |
| 2008/0077173 A1 | 3/2008 | Flanagan | |
| 2009/0002694 A1 | 1/2009 | Paavola | |
| 2009/0127238 A1* | 5/2009 | Corrigan | B23K 26/0823 219/121.68 |
| 2011/0058230 A1 | 3/2011 | Soeda | |
| 2011/0200802 A1 | 8/2011 | Li | |
| 2011/0297654 A1* | 12/2011 | Yoshikawa | B23K 26/046 219/121.62 |
| 2012/0061878 A1 | 3/2012 | Hofmann | |
| 2012/0218652 A1 | 8/2012 | Stone | |
| 2013/0320276 A1 | 12/2013 | Farrell | |
| 2014/0069921 A1 | 3/2014 | Kristal | |
| 2014/0313605 A1 | 10/2014 | Bessler | |
| 2015/0083302 A1 | 3/2015 | Sawada | |
| 2017/0182592 A1 | 6/2017 | Savitski | |

FOREIGN PATENT DOCUMENTS

| | | | |
|---|---|---|---|
| DE | 102008042343 A1 | 4/2010 | |
| DE | 102009021448 B3 | 7/2010 | |
| DE | 102010025375 A1 | 12/2011 | |
| DE | 102014108894 | 12/2015 | |
| EP | 2813347 | 12/2014 | |
| JP | 04143092 A * | 5/1992 | |
| JP | 05205839 A * | 8/1993 | |
| JP | 11245064 A * | 9/1999 | |
| JP | 2002067164 | 3/2002 | |
| JP | 2004063332 | 2/2004 | |
| JP | 2007230051 | 9/2007 | |
| WO | WO 2012/143181 A2 | 10/2012 | |
| WO | WO-2015161081 A1 * | 10/2015 | B23K 26/103 |
| WO | WO 2018/003133 A1 | 1/2018 | |

OTHER PUBLICATIONS

Machine translation of Japan Patent document No. JP05-205,839-A, May 2019.*
Machine translation of Japan Patent document No. 4-143,092-A, Jun. 2020 (Year: 2020).*
Olowinsky, Dr. Alexander, "Vortrag Technologie Seminar 2008 Verfahrenstechnik und Anforderungen an die Produktkonstruktion fur das Kunstsoffschweiben mit Laserstrahlung", ERW, Sep. 24, 2008, pp. 1-56, retrieved on Jul. 16, 2015 at http://www.wolf-produktionssysteme.de/de/veroeffentlicht/technologieseminar/technologieseminar2008/vortrag1.pdf (pp. 50-54).
Renner, T. et al., "Laser-adopted construction for plastic welding", retrieved on Jan. 15, 2007 from http://www.rofin.com/deutsch/anwendunen/laser-mikro-micro/data/E_PlastEurope02-04_Laser_adapted_Construction.pdf (p. 6, col. 1).
International Search Report and Written Opinion of International Application No. PCT/US2017/051734, dated Dec. 6, 2017 (12 pages).
International Search Report for Application No. PCT/US2014/040791, dated Jul. 2, 2007 (1 page).
Written Opinion of International Searching Authority for Application No. PCT/US2014/040791, dated Jul. 13, 2017 (5 pages).
International Search Report for Application No. PCT/US2017/054684, dated Jan. 16, 2018 (5 pages).
Written Opinion of International Searching Authority for Application No. PCT/US2017/054684, dated Jan. 16, 2018 (7 pages).
Kunststoffe; "Klare Sicht mit neuem Licht"; pp. 26-29; Jun. 1, 2015; XP055199510 (4 pages).
Brunnecker, F. et al.; "ClearJoining-Laserschweissen ohne Additive"; Carl Hanser Verlag, Munchen, Germany; vol. 103, No. 10, pp. 252-255; Jan. 1, 2013; XP001526380 (4 pages).
Klein, R. et al.; "Schreiben und schweissen in einem Additive"; Kunststoffe, Carl Hanser Verlag, Munchen, Germany; No. 1, pp. 16-19; Jan. 1, 2011; XP009147617 (4 pages).
International Search Report for Application No. PCT/US2015/026180, dated Sep. 21, 2015 (4 pages).
Written Opinion of International Searching Authority for Application No. PCT/US2015/026180, dated Sep. 21, 2015 (5 pages).
Office Action in Chinese Patent Application No. 201580020173.2, dated Oct. 18, 2017, with English machine translation.
"Plastic Racing Into the Future" Indianapolis ANTEC '96—vol. 1—Processing 1996,; The Society of Plastics Engineers; May 1996 (9 pages).
"Infrared Welding of Thermoplastics, Colored Pigments and Carbon Black Levels on Transmission of Infrared Radiation", by Robert A. Grimm and Hong Yeh—Edison Welding Institute; Mar. 31, 1998 (7 pages).
"Application With Infrared Welding of Thermoplastics", by David A. Grewell, Branson Ultrasonics Corporation; Apr. 29, 1999 (5 pages).
"Forward to Better Understanding of Optical Characterization and Development of Colored Polyamides for the Infra-Red/Laser Welding: Part I—Efficiency of Polyamides for Infra-Red Welding", by Val Kagan, Robert Bray and Al Chambers—Honeywell International, Engineered Applications & Solutions, Morristown, NJ 07962-2332, USA; Apr. 2003 (7 pages).
"Three Approaches in Utilizing High Power Diode Laser to Join Thermoplastics", by Steven A. Kocheny—Lester Technologies, LLC., and Jerry Zybko—Lester Technologies, LLC; May 2002 (5 pages).
"Comparative Investigations on Quasi-Simultaneous Welding on the Basis of the Materials Peek and PC", by H. Potente, G. Fiegler, F. Becker and J. Korte—University of Paderborn, Paderborn, Germany; May 2002 (5 pages).
"3D-Laser Transmission Welding", by H. Haberstroh, R. Luetzeler—Institut für Kunststoffverarbeitung, Aachen, Germany; May 2004 (6 pages).
IPG Photonics; "Mid-IR Microwelder Pulsed/ CW Materials Processing Station"; retrieved from the Internet from: www.ipgphotonics.com/midir_microwelder.htm; May 2013 (2 pages).

(56) References Cited

OTHER PUBLICATIONS

International Search Report and Written Opinion of International Searching Authority for Application No. PCT/US2020/016618, dated Apr. 30, 2020 (10 pages).

* cited by examiner

SYSTEMS AND METHODS FOR LASER-WELDING TUBULAR COMPONENTS USING A SINGLE, FIXED OPTICAL REFLECTOR WITH MULTIPLE REFLECTING SURFACES

CROSS-REFERENCE TO RELATED APPLICATIONS

This application claims priority to and the benefit of U.S. Provisional Patent Application No. 62/801,269, titled "Systems and Methods for Laser-Welding Tubular Components Using a Single, Fixed Optical Reflector with Multiple Reflecting Surfaces," filed Feb. 5, 2019, which is incorporated by reference in its entirety.

FIELD OF THE INVENTION

Aspects of the present disclosure relate generally to laser-welding systems and, more particularly, to systems and methods for welding tubular components using a laser beam and a single, fixed optical reflector having multiple optically reflecting surfaces.

BACKGROUND

Most medication delivery devices incorporate plastic tubing that connects different parts of the device and those through which the medicine is delivered to the patient. A joint between various tubular components, such as tube-to-port, or tube-to-tube type is one of the most common sub-assembly and can be found in most medication delivery devices.

A laser-welding process is currently the most advanced assembly technique, and has a number of proven benefits for a high-volume manufacturing. However, utilizing a laser-welding process for joining tubular components between themselves and to other parts presents a technical challenge, as it requires a 360° circumferential weld around the mating surfaces. Because rotating the laser source around the assembly, or spinning the assembly (which may have a container or other components attached to it) under a stationary laser head are not always feasible for a manufacturing process, a number of methods have been proposed to address this challenge.

For example, a tubular workpiece can be disposed longitudinally at a center of a concave circular mirror surrounding the workpiece. Then, the laser beam is swiveled or circled around the mirror above the workpiece, directing the laser beam around the entire circumferential outer surface of the workpiece. This conventional technique is not suitable in a manufacturing environment because manipulation of the workpiece through the center of the circular mirror is very difficult and burdensome particularly in a high-production setting.

By way of another example, a complex set of optical reflectors are used to redirect the laser beam onto an opposite side of the workpiece. A combination of multiple concave and flat mirrors, such as conical, spherical, and plane mirrors, is used for deflecting the laser beam toward the opposite and lateral sides of the workpiece during welding. However, such intricate and convoluted optical systems are very expensive and difficult to repair during maintenance.

Another conventional approach is proposed in US Patent Application Publication No. 20170182592A1, which describes a pair of adjustable optical reflectors positioned under the tubular assembly, whose angles, as well as lateral and vertical positions can be adjusted, so the beam reflected from these reflectors could cover both sides of the bottom part of the assembly, while the upper part of the assembly is being exposed to the direct beam, which scans the assembly in lateral direction. The stated aim of this method is to deliver a "simpler, more space-saving technique." However, in order for the reflected beam to heat uniformly the whole bottom part of the assembly, and generate an even melting of the material, this method requires a time-consuming adjustment of each of the reflector pairs to find the correct angle and lateral and vertical position of the two reflectors in relation to the assembly.

If the angle between the two reflectors, or their lateral or vertical position are not correct, this error would result in uneven heating of different portions of the bottom part (workpiece). For example, a wider angle between the reflectors or a larger distance in the Z-axis (vertical relative to ground) between the two reflectors' base and the position of the assembly would lead to overheating of the very bottom of the workpiece part and under-heating of its sides. A larger lateral distance between the reflectors, a smaller angle, or a shorter Z axis separation, would result in excessive heating of the sides of the bottom part of the assembly, and under-heating of the center of the bottom (the lowest portion), which would cause an inadequate heating and potential leak path at that location. In order to heat both sides of the bottom part of the workpiece in the assembly uniformly, the angle between the Z axis (vertical) and the surface of both reflectors needs to be exactly the same, and while adjusting the angular position of one reflector is easy, measuring the angle between the reflectors in the fixture is very awkward, time-consuming, and challenging. As this adjustment needs to be iterated a number of times to find the correct angle corresponding to a specific position of the assembly, and to ensure that the position of both reflectors is identical. This need for a precise angular alignment of both reflectors relative to one another significantly contributes to the difficulty of the setup.

In other words, the approach proposed in US Patent Application Publication No. 20170182592A1 provides too many opportunities for setup error or a prolonged setup time because of the numerous adjustment combinations that have to be made to multiple operating components of the assembly for each workpiece part.

Therefore, what is needed are systems and methods for more accurately laser-welding tubular components that yields more consistent and higher quality weld results without requiring extensive, error-prone, or time-consuming pre-adjustment or calibration of the assembly prior to welding in a high-production manufacturing setting.

SUMMARY OF THE INVENTION

Aspects of the present invention reflect improvements to the disclosure set forth in US Patent Application Publication No. 20170182592A1. A key difference is that instead of using a pair of optical reflectors, the present disclosure proposes to use a single, unitary, fixed optical reflector having multiple optically reflecting side surfaces (configured to reflect a laser beam) that are angled at an obtuse angle (greater than 90 degrees and less than 180 degrees) relative to each other. Another key difference is that the only pre-welding setup required for the welding assembly is a Z-axis adjustment (vertical direction) of the workpiece relative to the optical reflector before initiating the laser weld. No adjustment of the respective lateral positions or angles of the reflecting surfaces relative to one another is required relative to the workpiece. Indeed, because the optical reflector of the present disclosure is a fixed, unitary piece, no such adjustment is even possible. Thus, the optical reflector remains fixed at all times, both pre-weld during setup of the equipment, and during welding itself in which laser energy is imparted to the workpiece. Furthermore, the laser source does not need to be rotated around the workpiece during welding, but rather remains at a stationary distance relative to the workpiece both pre-weld during setup and during the weld. These aspects produce a consistently high quality 360-degree circumferential weld with high repeatability and very low variability, and very minimal setup time and effort (only adjustment of the vertical distance between the workpiece and the bottom or center of the optical reflector), in a high-production setting where setup time needs to be minimized, but the weld must be consistent and of high quality from part to part without requiring micro-adjustments to the setup while the same parts are being welded during a manufacturing process. The present disclosure promotes a "set it and forget it" configuration of a laser-welding setup for circumferential welding of tubular parts (workpieces), with only one adjustment needed during setup before welding is initiated for the same parts without requiring any further adjustments for the same part in a high-production setting. Not only is weld quality overall improved and remarkably consistent from part to part, but throughput is significantly increased due to the quick setup time (vertical adjustment of one part of the assembly) and elimination of any adjustments needed once the setup has been completed.

BRIEF DESCRIPTION OF THE DRAWINGS

The invention will be better understood from the following description of preferred embodiments together with reference to the accompanying drawings, in which.

DETAILED DESCRIPTION OF THE ILLUSTRATED EMBODIMENTS

Figure 1:
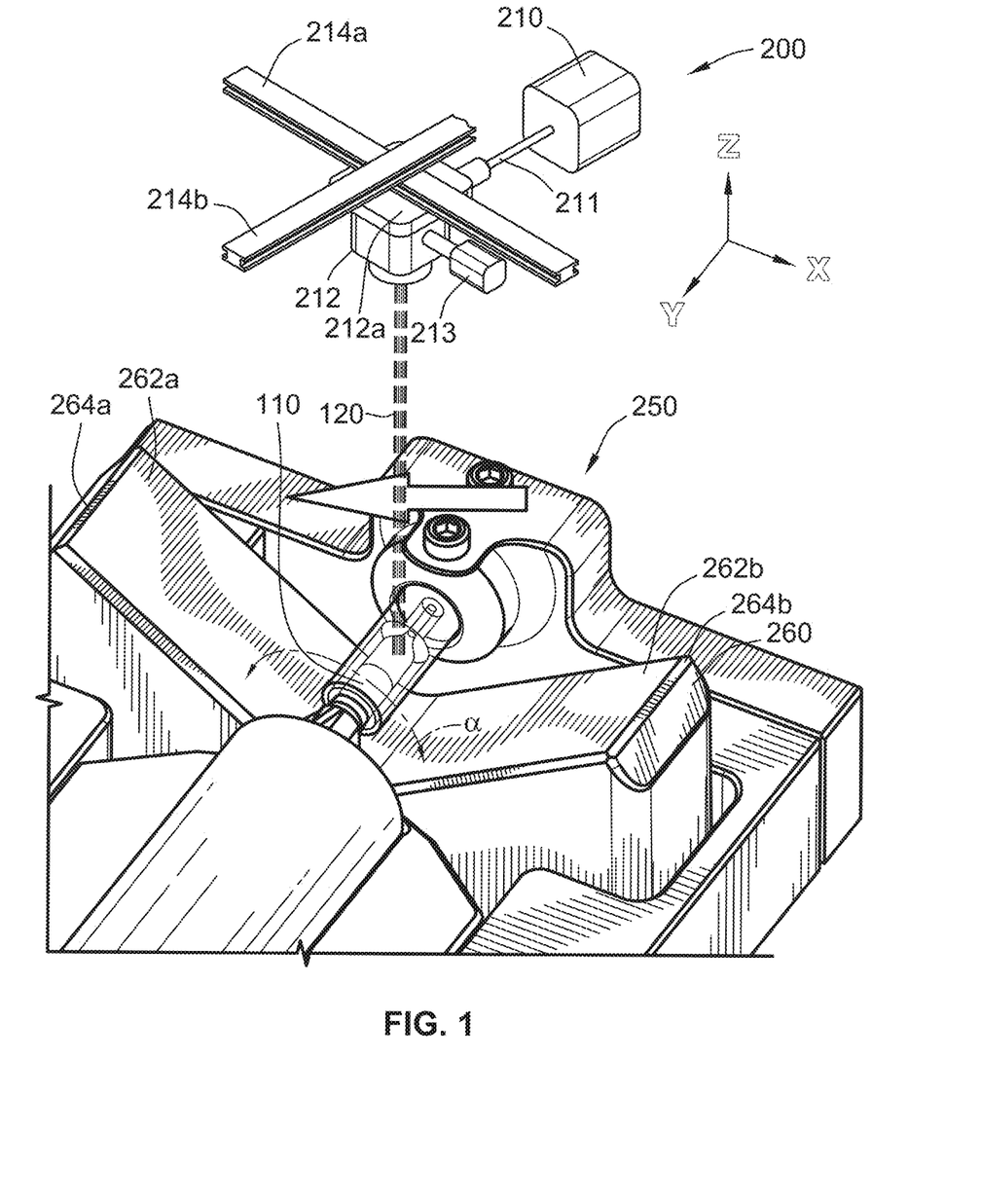
FIG. 1 is an example laser assembly and workpiece assembly with a fixed U-shaped optical reflector with stationary reflecting surfaces fixed at an obtuse angle.

A laser assembly 200 shown in FIG. 1 includes a conventional laser source 210, which generates a laser beam 120 of radiation. A mount 212a is coupled to orthogonal gantries 214a and 214b. One or more scanner mirrors within a scan head 212 are controlled by a processor-controlled drive unit 213 to direct a laser beam 120 downwardly onto an assembly 250 that includes a thermoplastic workpiece 110 having a tubular part to be joined by welding. The drive unit 213 is controlled to adjust the positions of the scanner mirrors to move the laser beam 120 in a manner required to illuminate a prescribed weld zone on the top surface of the workpiece 110 fixed within the assembly 110.

Figure 5:
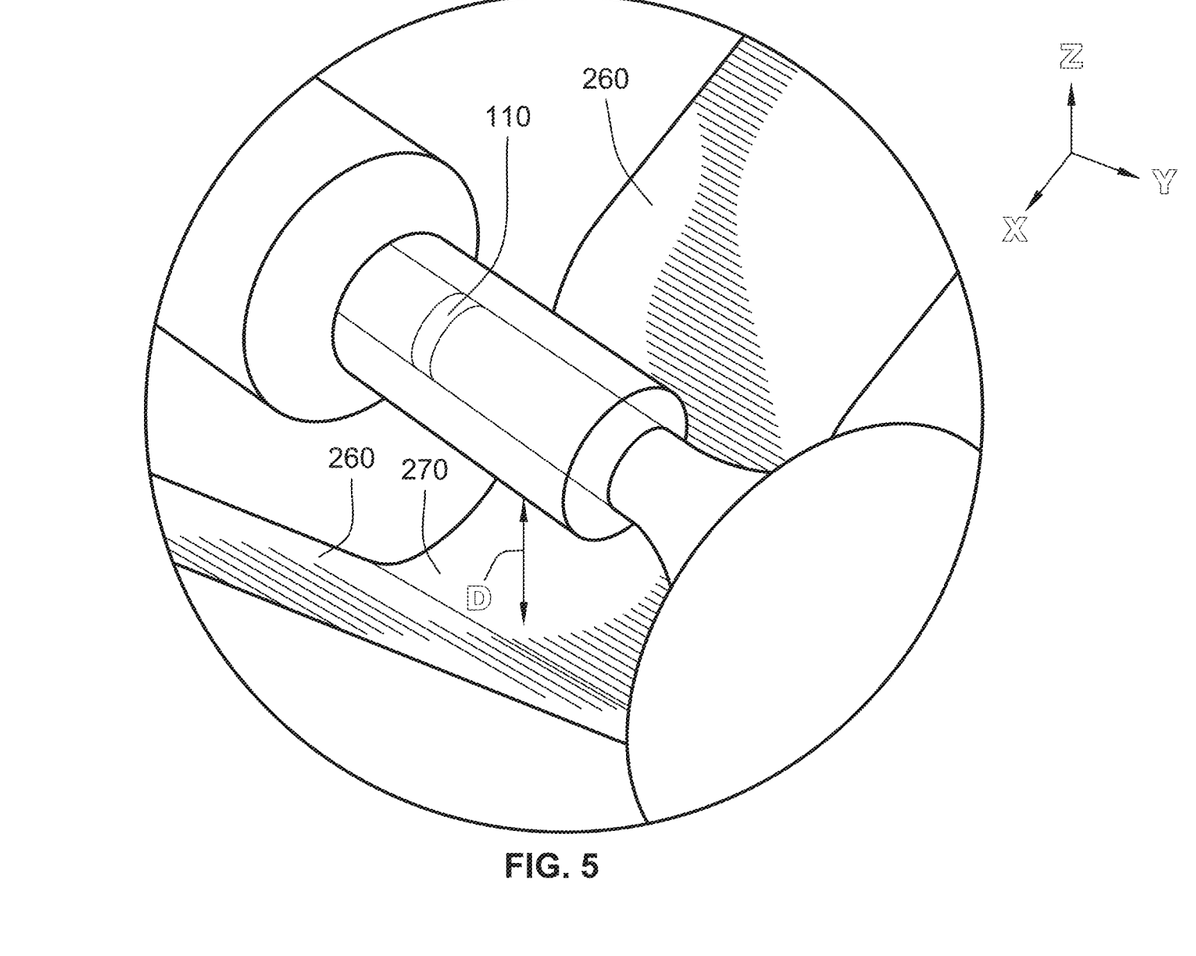
FIG. 5 is a perspective view of an adjustable vertical distance between the workpiece and the bottom or lowest point of the top surface of the optical reflector.

Based on the experimentation it has been established that using a single, unitary V- or U-shaped reflector 260 having two flat side surfaces 262a, 262b fixed at approximately 110-135 degrees (e.g., plus or minus 15%) to each other and a continuous reflecting surface from end-to-end 264a, 264b, allows the setup for a tubular workpiece 110 placed equidistant to the sides 262a, 262b of the optical reflector 260 to be greatly simplified compared to conventional approaches, and limits the required setup effort to only the vertical adjustment (Z-axis) of the part position. Moving the workpiece 110 and the optical reflector 260 closer together (decreasing distance D labeled in FIG. 5) allows to direct more laser energy from the laser source 210 to the very bottom of the workpiece part 110, whereas moving the workpiece 110 and the optical reflector 260 farther apart (along the Z-axis or increasing distance D shown in FIG. 5) increases the illumination of the sides of the lower portion of the workpiece 110. Once the Z value which provides an even illumination of the bottom portion of the part is found, the workpiece 110 and the optical reflector 260 are locked to that Z-value distance D (FIG. 5), and the setup is complete. Scanning the workpiece 110 with the laser beam 120 in a lateral direction (no rotation, see X and/or Y axis labeled in FIG. 1) by the weld head 212 positioned above the assembly 250, will illuminate the upper portion of the workpiece 110 by direct exposure to the laser beam 120, and the bottom portion of the workpiece 110 by the laser beam 120 reflected by the V- or U-shaped reflector 260, thus allowing a 360° circumferential weld around the tubular workpiece 110.

Figure 2:
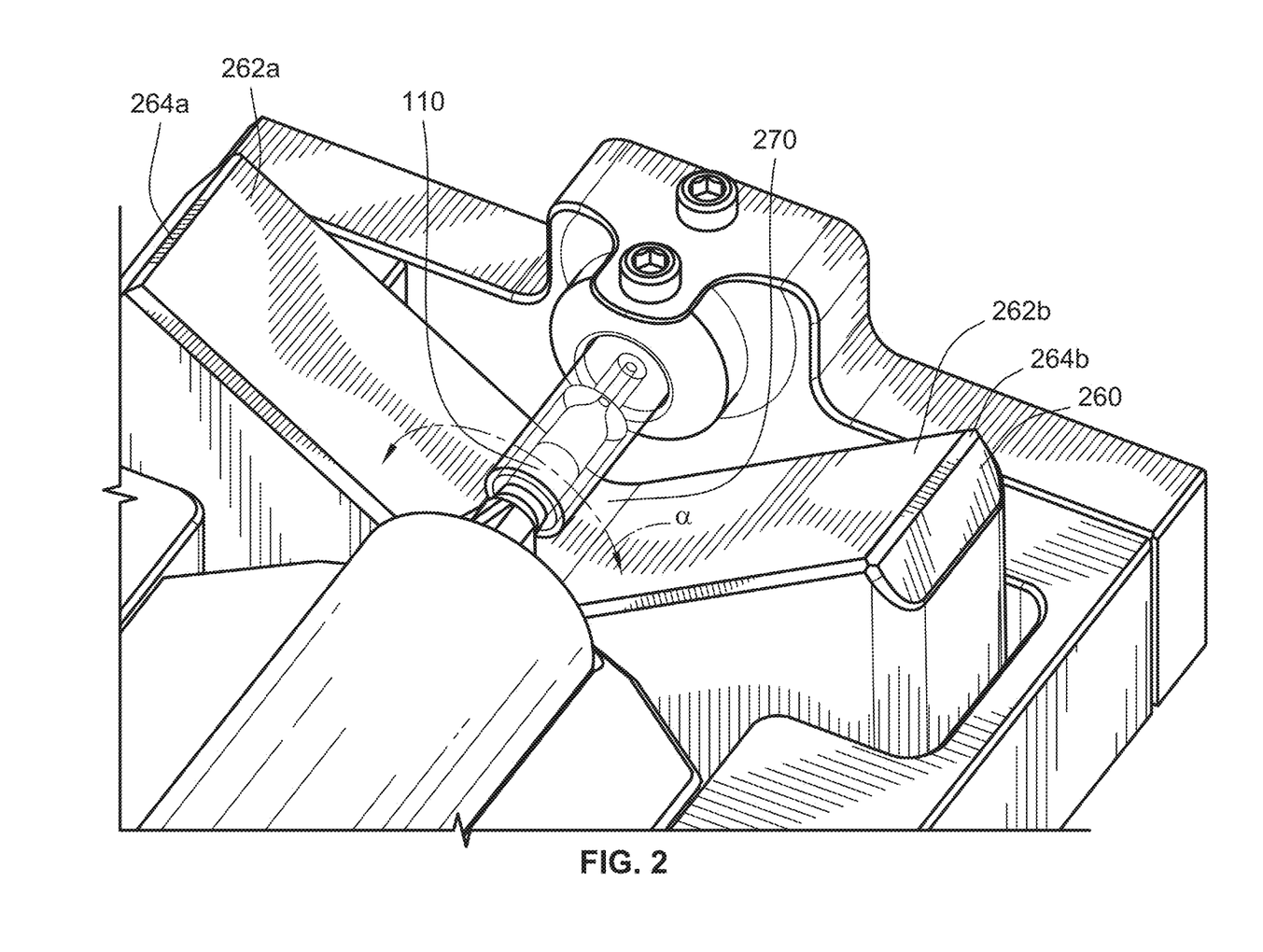
FIG. 2 is a perspective view of the workpiece assembly shown in FIG. 1.

The optical reflecting surface(s) 262a, 262b of the optical reflector 260 can be a gold-plated mirror, which is configured to reflect laser energy 120 received. The angle of the surfaces 262a, 262b direct the laser energy 120 into surfaces of the workpiece 110 that are not directly accessible to the laser beam 120, which is fixed above the workpiece 110. Those of ordinary skill in the welding art will appreciate that the entire surface 262a, 262b does not have to be coated with an optically reflecting material. As a practical matter, it is convenient to plate the entire surface of the optical reflector 260 with gold or other optically reflecting material, but of course only the surface portions of the optical reflector 260 where the laser beam 120 will be directed need to have an optically reflecting material. The other portions do not have to optically reflecting, such as the bottom or lowest portion 270 (best seen in FIGS. 2 and 5) directly below the workpiece 110 where no laser energy will be received. The portion 270 (FIG. 2) directly underneath the workpiece 110 receive the reflected laser energy that bounce off of the optically reflecting surfaces 262a, 262b of the optical reflector 260. All this is to say that those skilled in the art will appreciate that only those surface portions where laser energy 120 will be directed need to be optically reflecting on the optical reflector 260. The key point here is that the optical reflector 260 is non-moving and stationary at all times, including during setup of the assembly when the vertical distance, D, along the Z-axis between the underside of the workpiece 110 and the bottom or lowest point 270 of the optical reflector 260 directly below the underside of the workpiece 110 is being optimized.

The first 262a and second 262b side surfaces of the fixed optical reflector 260 are arranged at a fixed obtuse angle α relative to each other. By fixed it is meant that the angle α is unchanged even during setup before the laser weld is initiated. The assembly 250 has a height adjustment mechanism (not shown) that is configured to adjust a vertical distance D between the lowest point 270 of the optical reflector 260 and the underside of the workpiece 110 along a Z-axis that is transverse to a longitudinal axis (e.g., Y-axis) of the workpiece 110. Preferably, the workpiece 110 is the adjustable part of the assembly 250, such that the workpiece 110 is moved up or down relative to the optical reflector 260 to change the vertical distance D (shown in FIG. 5). Alternately, the workpiece 110 can be fixed, and the optical reflector 260 is adjusted up or down to change the vertical distance D; however, at all times the angle α between the reflecting surfaces 262a, 262b is constant and fixed. In yet another alternative, both the workpiece 110 and the optical reflector 260 can be adjusted along the Z-axis to change the distance D, for example, in an assembly 250 that has been retrofitted or modified to be configured according to the present disclosure.

The first and second side surfaces 262a, 262b define a curve that is transverse to the longitudinal axis (e.g., Y-axis), and this curve forms the V- or U-shape of the optical reflector 260. Note that this portion does not have to be strictly curved, because no laser energy will be directed to this portion, so its shape plays no role and therefore has no impact on optical reflection. Rather, it can be relatively flat or notched, depending on the design parameters and the angle of the reflecting surfaces 262a, 262b. It also does not have to be coated with an optically reflecting material, but for ease of manufacturability, coating the entire surface of the optical reflector 260 is desirable from that standpoint.

While in one aspect the reflecting surface on the optical reflector 260 can be continuous, those skilled in the art will appreciate that the portion of the optical reflector 260 that sits directly underneath or below (relative to the incoming laser beam 120) the workpiece 110 does not directly receive the laser beam 120, and thus it is not necessary to render that part of the surface optically reflecting. While it is easier to manufacture a continuous surface, the present disclosure is not limited to a continuous surface. The flat side surfaces 262a, 262b of the optical reflector 260 can receive a reflective optical coating, whereas the portion 270 of the optical reflector 260 that sits directly beneath the workpiece 110 can lack a reflective optical coating. Moreover, while a single, unitary optical reflector 260 is also described, in other aspects, the optical reflector 260 can be composed of multiple parts, but all such parts being fixed and stationary to one another so that their angle α cannot be adjusted during setup of the assembly 250. The point is that there are at least two reflecting surfaces 262a, 262b that are fixed and stationary during the setup of the assembly 250, such that only a vertical adjustment of the distance D between the workpiece 110 and those reflecting surfaces 262a, 262b is necessary during setup. This differs from conventional approaches that allowed too much freedom of adjustment of the lateral distance and angular displacement of the reflectors and distance between workpiece and the reflectors, but this freedom leads to longer setup times and more complex setup parameters, iterative adjustments of the setup parameters, and other problems indicated above.

Figure 3:
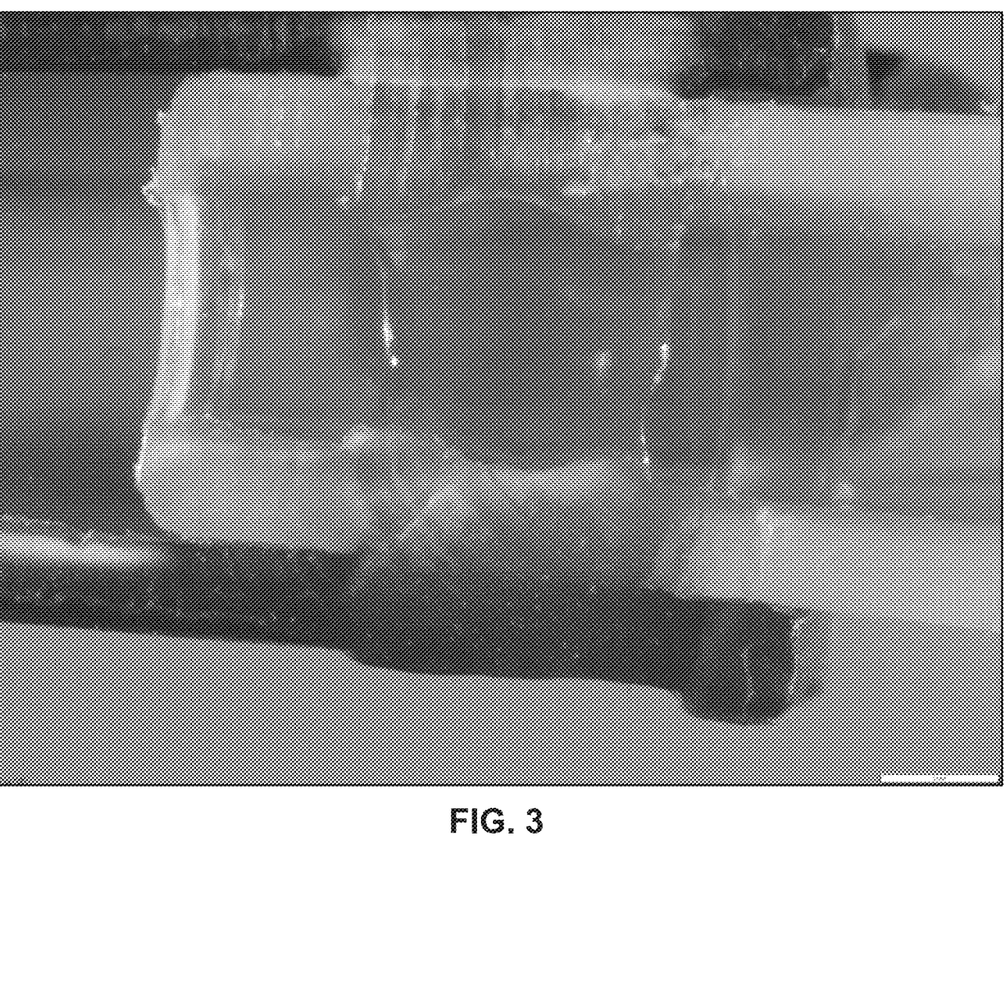
FIG. 3 is an example photograph of a laser weld achieved using the optical reflector according to the present disclosure.
Figure 4:
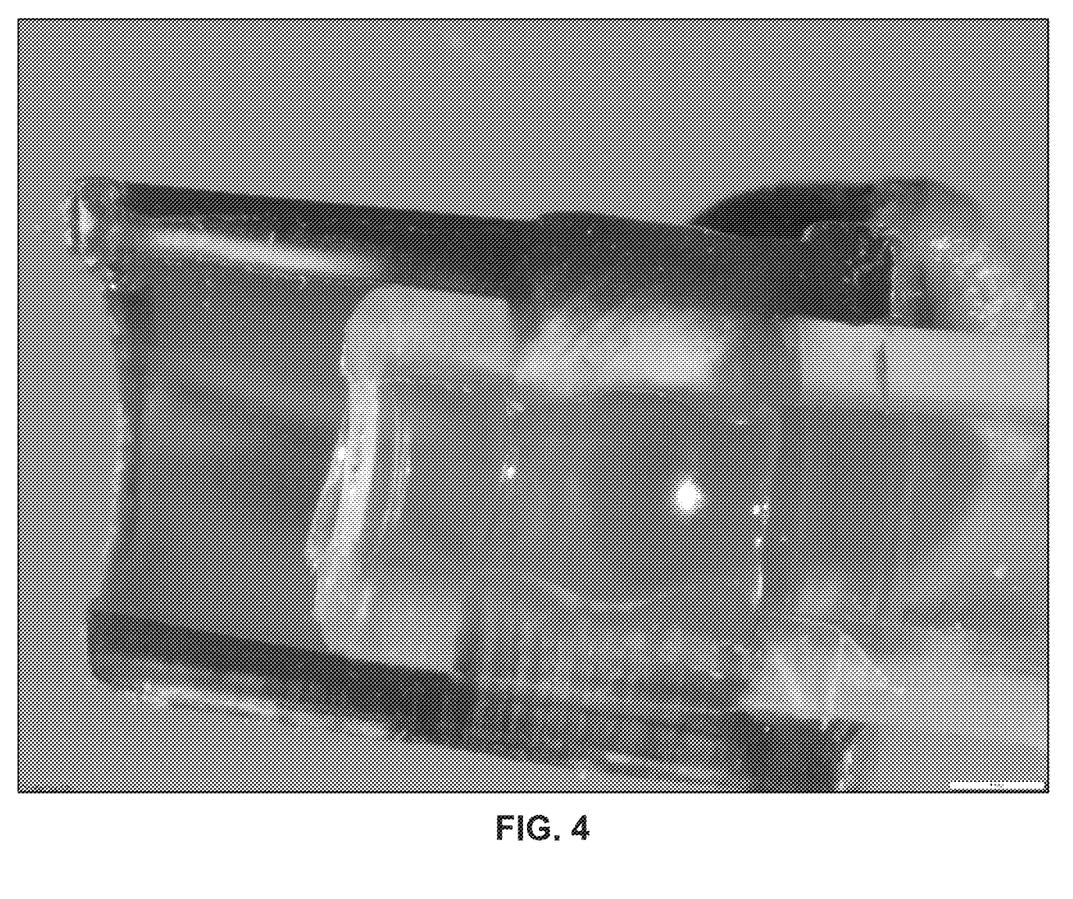
FIG. 4 is a further example photograph of a laser weld achieved using the optical reflector according to the present disclosure.

FIGS. 3-4 illustrate photographs of cross-sections of thermoplastic sample workpieces joined by the welding apparatus and method disclosed herein, showing the high quality and consistently uniform weld circumferentially around the joined interfaces. The reflecting surfaces 262a, 262b were angled at an angle α of 133 degrees.

Although the inventions and other aspects will be described in connection with certain preferred embodiments or examples, it will be understood that the present disclosure is not limited to those particular embodiments or examples. On the contrary, the present disclosure is intended to cover all alternatives, modifications, and equivalent arrangements as may be included within the spirit and scope of the invention as defined by the appended claims.

What is claimed is:

1. A laser welding system for welding around a circumference of a workpiece, the system comprising:
   a laser beam source configured to direct a laser beam;
   an assembly including a unitary optical reflector having at least two optical reflecting surface portions on a first side surface and a second side surface, respectively, of the optical reflector, the first and second side surfaces of the optical reflector being arranged at a fixed obtuse angle relative to each other, the workpiece being moveable relative to the optical reflector, which is fixed relative to workpiece, along an axis that is transverse to a longitudinal axis of the workpiece to adjust a vertical distance between the optical reflector and the workpiece, the first and second side surfaces defining a curve that is transverse to the longitudinal axis; and
   a scan head configured to move relative to the workpiece to move the laser beam along the optical reflector to thereby produce a 360 degree circumferential weld around the workpiece.

2. The system of claim 1, wherein the optical reflector has an approximately V- or U-shape such that the first and second side surfaces are flat and converge to a curved surface.

3. The system of claim 2, wherein the continuous reflecting surface extends continuously from an end portion of the first side surface to a corresponding end portion of the second side surface.

4. The system of claim 1, wherein the at least two optical reflecting surface portions are part of a single, continuous reflecting surface that extends from an end of the first side surface to an end of the second side surface.

5. The system of claim 1, wherein the unitary optical reflector is a single part.

6. The system of claim 1, wherein the scan head is coupled to a mount and a pair of orthogonal gantries.

7. The system of claim 1, wherein the optical reflector is non-movable and fixed relative to the scan head.

8. A laser welding method for welding around a circumference of a workpiece, the method comprising the steps of:
   providing a fixed, non-movable unitary optical reflector having at least two optical reflecting surface portions on a first side surface and a second side surface, respectively, arranged at an obtuse angle relative to each other;
   positioning and fixing a workpiece in an assembly that includes the unitary optical reflector;
   responsive to the fixing the workpiece, adjusting the vertical distance between the unitary optical reflector and the workpiece by moving the workpiece relative to the fixed, non-movable optical reflector along an axis that is transverse to a longitudinal axis of the workpiece, the first and second side surfaces defining a curve that is transverse to the longitudinal axis; and
   responsive to the adjusting, directing a laser beam so that it moves along the optical reflector to thereby produce a 360 degree circumferential weld around the workpiece.

9. The method of claim 8, wherein the optical reflector has an approximately V- or U-shape such that the first and second side surfaces are flat and converge to a curved surface.

10. The method of claim 9, wherein the continuous reflecting surface extends continuously from an end portion of the first side surface to a corresponding end portion of the second side surface.

11. The method of claim 8, wherein the at least two optical reflecting surface portions are part of a single, continuous reflecting surface that extends from an end of the first side surface to an end of the second side surface.

12. The method of claim 8, wherein the unitary optical reflector is a single part.

\* \* \* \* \*